United States Patent Office 2,943,843
Patented July 5, 1960

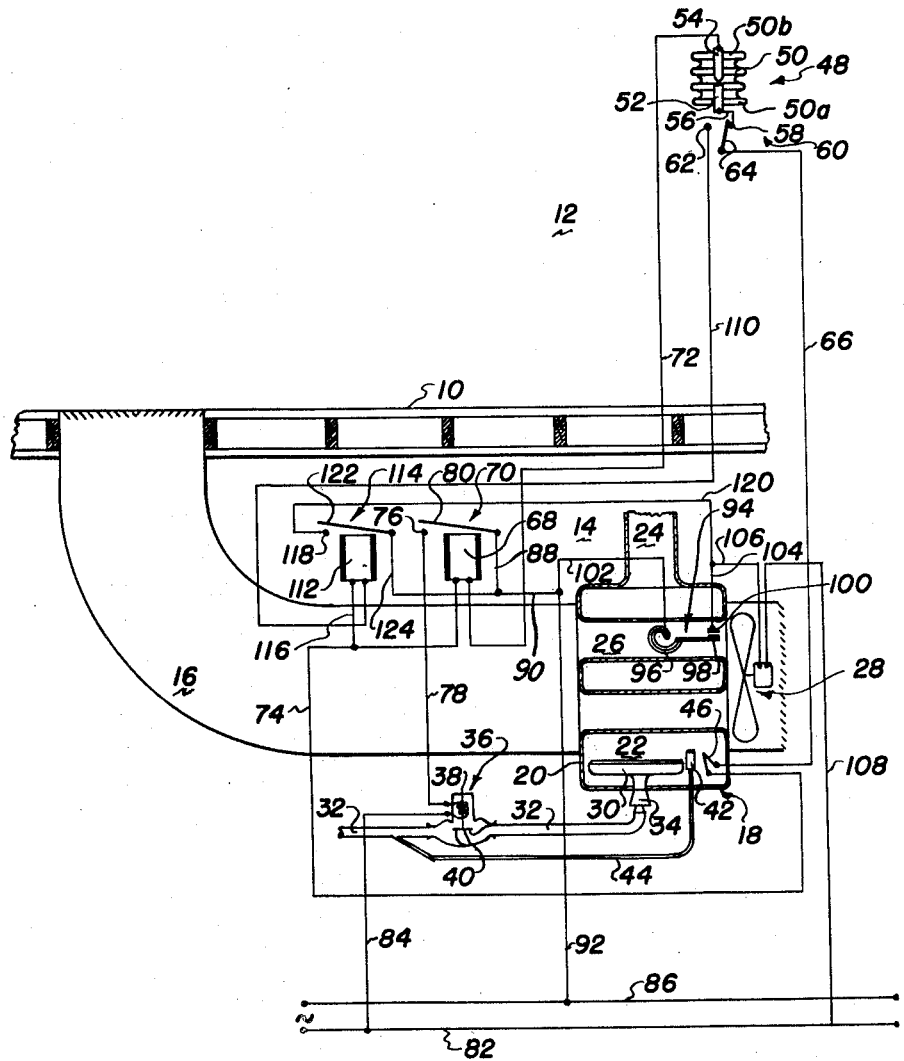
FIG. I
INVENTOR.
Russell B. Matthews
BY
Aegert & Schwalbach
Att'ys

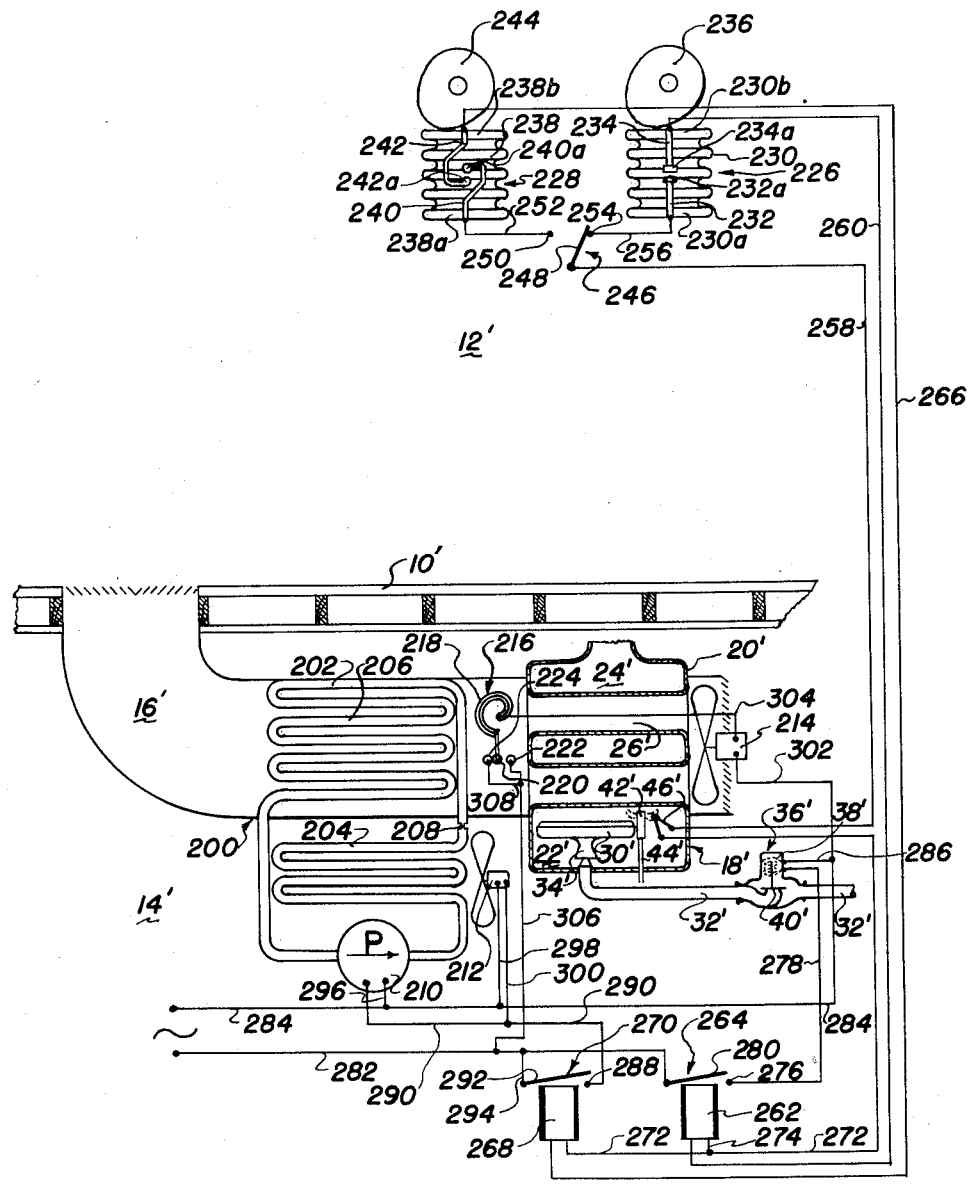

2,943,843
TEMPERATURE CONTROL APPARATUS

Russell B. Matthews, Wauwatosa, Wis., assignor to Baso Inc., Milwaukee, Wis., a corporation of Wisconsin Filed Feb. 12, 1957, Ser. No. 639,749

2 Claims. (Cl. 257—286)

This invention relates to temperature control apparatus and more particularly to apparatus of the aforementioned character employing thermoelectric power.

More specifically, the present invention pertains to control means for fluid fuel heating means employing a flame responsive thermoelectric generator for providing safety shut off of the heating means upon outage of a pilot burner, and cooling means also under control of the thermoelectric generator during the non-heating cycle, the control means being thermoelectrically powered thereby eliminating the need for running higher outside power lines to remotely positioned thermostat and selector switch means.

An object of the present invention is to provide control means comprising thermoelectrically powered electroresponsive means for control of heating means and cooling means selectively in accordance with the temperature desired.

Another object of this invention is the provision of thermoelectrically powered temperature control means including manual switch means for control of heating means and cooling means selectively, said switch means having no connection with higher outside or line power.

Another object is to provide thermoelectrically powered temperature control means including means for providing continuous running of electrically driven fan means and interlock means for preventing heating during such continuous run operation.

Another object is to provide temperature control apparatus as characterized above wherein blower means under control of thermoelectrically powered control means is provided for circulating, into a given space, the heated air afforded by the heating means, said blower means being under control of said thermoelectrically powered control means during the non-heating season to circulate unheated air into said given space regardless of thermostatic conditions.

Another object is to provide temperature control apparatus as characterized above wherein air conditioning or refrigerating means is employed during the non-heating season, said air conditioning or refrigerating means being under control of thermoelectrically powered control means subject to a flame at the pilot burner of the heating means.

Another object is the provision of temperature control apparatus as characterized above, wherein the blower means is responsive to a predetermined high temperature within the heating means and to a predetermined low temperature within the air conditioning means to circulate such heated or cooled air to a space the temperature of which is to be controlled.

Another object is to provide temperature control apparatus as characterized above, including thermostatic switch means in the thermoelectric circuit for maintaining the desired temperature within the given space.

Another object is to provide temperature control apparatus as characterized above, wherein the thermostatic switch means comprises encapsulated low resistance electrical contacts for controlling thermoelectric current.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Figure 1 is more or less a schematic showing of a first embodiment of the present invention, Figure 2 is a similar showing of a second embodiment of the present invention.

Referring to Figure 1 of the drawings, it shows a wall or floor section 10 affording separation of a space 12, the temperature of which is to be controlled, and a space 14, wherein temperature control apparatus to be hereinafter described is installed.

Positioned within space 14 and extending into a suitable opening in floor section 10, is an air duct 16. Positioned within duct 16 is a heating unit 18 of the fluid fuel burning type having a sheet metal enclosure 20 formed with partition walls or dividers affording a combustion chamber 22 having communication with a flue or exhaust stack 24 for removal of the products of combustion. Such partition walls also provide a bonnet or plenum chamber 26 in heating relation to the combustion chamber 22 and having direct communication with the interior of air duct 16. Electrically operated fan means 28 is positioned within duct 16 for moving air through plenum chamber 26 and air duct 16 to space 12.

Positioned within combustion chamber 22 is a main fuel burner 30. A main fuel supply conduit 32 is provided to afford fuel flow to main burner 30 through a mixing chamber 34 as well understood in the art. An electroresponsive flow-control device 36 having an energizing coil 38 energizable to move a valve member 40 to flow-permitting position and deenergizable to permit return of valve member 40 to its flow-preventing position, is positioned within conduit 32 for control of fuel flow to main burner 30. Juxtaposed with respect to main burner 30 within combustion chamber 22, is a pilot or ignition burner 42 afforded fuel flow independently of flow-control device 36, through a pilot fuel supply conduit 44. A thermoelectric generator or thermocouple 46 is positioned adjacent pilot burner 42 for generation of an electrical potential whenever pilot burner 42 is ignited.

A temperature responsive circuit controlling device or thermostat 48 having an enclosure or bellows 50 preferably provided with a subatmospheric expansible and contractible volatile fluid fill is positioned within space 12. Device 48 further comprises cooperating electrical contact members 52 and 54 insulatedly fixed respectively to relatively movable opposite end walls 50a and 50b of bellows 50. A lead wire 56 affords connection of contact member 52 with a stationary contact 58 of a single-pole double-throw manually operated switch 60. Switch 60 also comprises another stationary contact 62 and a movable pole or contactor 64 which is connected to one side of thermocouple 46 by a lead wire 66.

Contact member 54 of device 48 is connected to one side of an energizing winding 68 of an electroresponsive relay 70 by means of a lead wire 72. The other side of winding 68 is connected to one side of thermocouple 46 by a lead wire 74. Electroresponsive relay 70 further comprises a stationary contact 76 connected to one side of energizing coil 38 of device 36 by means of a lead wire 78, and a movable contactor 80 for engagement with contact 76 in response to energization of winding 68.

The other side of coil 38 is connected to an electrical conductor 82 by a lead wire 84. Contactor 80 of relay 70 is connected in circuit with another electrical conductor 86 by lead wires 88, 90 and 92. Electrical conductors 82 and 86 are connected to a source of outside power (not shown) to afford energization of various electrical components, as will hereinafter appear.

Positioned within plenum chamber 26 of heating unit 18 is a temperature responsive circuit controlling device 94 comprising a bimetal element 96 carrying a movable electrical contact 98 for cooperation with a stationary contact 100. As is well understood in the art, bimetal element 96 is formed of materials having dissimilar coefficients of expansion for deformation of element 96 in response to temperature changes thereabout. A lead wire 102 affords connection of element 96 with lead wire 92, while stationary contact 100 is connected to one side of electrically operated fan means 28 by lead wires 104 and 106. The other side of fan means 28 is connected to conductor 82 by a lead wire 108.

Stationary contact 62 of switch 60 is connected by a lead wire 110 to one side of an energizing winding 112 of an electroresponsive relay 114. The other side of winding 112 is connected to lead wire 74 by a lead wire 116. Relay 114 further comprises a stationary contact 118 which is connected to lead wire 106 by means of a lead wire 120, and a movable contactor 122 for engagement with contact 118 in response to energization of winding 112. Contactor 122 is connected to lead wire 90 by a lead wire 124.

The operation of the embodiment shown in Figure 1 will now be described:

The fuel emitted at pilot burner 42 as supplied thereto through conduits 32 and 44 may be ignited in any desired manner. The flame at pilot burner 42 effects heating of the hot junction of thermocouple 46 for generation of an electrical potential across the junctions thereof.

If it is desired to maintain space 12 at a temperature higher than ambient temperature, it is merely necessary to move contactor 64 of manually operable switch 60 into engagement with stationary contact 58. Under these conditions, whenever the temperature of the fluid fill of bellows 50 drops below the temperature setting of thermostat 48, contact members 52 and 54 are brought into circuit completing engagement due to contraction of the fluid fill and corresponding relative movement of end walls 50a and 50b of bellows 50. Such engagement of members 52 and 54 causes thermocouple 46 to effect energization of winding 68 of electroresponsive relay 70 through a circuit including lead wire 66, contactor 64, lead wire 56, contact members 52 and 54, lead wire 72, winding 68, and lead wire 74. Energization of winding 68 causes movable contactor 80 of relay 70 to be magnetically attracted into engagement with stationary contact 76 for energization of coil 38 of flow control device 36 through a circuit comprising lead wire 84, coil 38, lead wire 78, contactor 80 and lead wires 88, 90 and 92. Such energization of coil 38 effects movement of valve member 40 to flow-permitting position whereupon fluid fuel is permitted to flow to main burner 30 through main fuel conduit 32. The fluid fuel thus emitted at main burner 30 is ignited by the flame of pilot burner 42 for heating of the air within plenum chamber 26.

As the temperature within plenum chamber 26 increases, bimetal element 96 of temperature responsive switch 94 deforms accordingly until a predetermined temperature is reached, effecting engagement of electrical contacts 98 and 100. Such operation of switch 94 effects energization of fan means 28 through a circuit consisting of lead wire 108, fan means 28, lead wires 106 and 104, switch 94, and lead wires 102 and 92. Energization of fan means 28 causes the heated air within plenum chamber 26 to be moved or pushed through air duct 16 into space 12 for increasing the temperature about switch 48.

The temperature within space 12 and about thermostat 48 continues to increase until the fluid fill of bellows 50 expands sufficiently to effect separation or electrical disconnection of contact members 52 and 54. Such relative movement of members 52 and 54 interrupts energization of winding 68 of electroresponsive relay 70 whereupon valve member 40 of flow-control device 36 is permitted to return to flow-preventing position by virtue of deenergization of coil 38 thereof as effected by disengagement of contactor 80 and stationary contact 76 of relay 70. Thus, further heating of the air within plenum chamber 26 is prevented although fan means 28 continues to be energized for movement of heated air through air duct 16 until the temperature within plenum chamber 26 decreases sufficiently to cause bimetal element 96 of switch 94 to effect separation of electrical contacts 98 and 100. Under these conditions, the temperature within space 12 is at or above the temperature desired to be maintained therewithin.

When the temperature within space 12 decreases below such desired temperature, the aforementioned heating operation will again be effective, the fluid fill of bellows 50 effecting electrical engagement of contact members 52 and 54 for sequential energization of winding 68 by thermocouple 46 and coil 38 by the outside source of power. Temperature responsive switch 94 will again respond to a predetermined temperature within plenum chamber 26 to effect energization of fan means 28 for moving the heated air through air duct 16.

If it is desired to merely circulate air within space 12 without operation of the heating unit, as may occur when the ambient temperature is higher than the temperature desired to be maintained therewithin, it is merely necessary to move contactor 64 of switch 60 out of engagement with stationary contact 58 and into engagement with stationary contact 62. Such operation of contactor 64 causes thermocouple 46 to effect energization of winding 112 of electroresponsive relay 114 through a circuit consisting of lead wire 66, contactor 64, lead wire 110, winding 112, and lead wires 116 and 74. Energization of winding 112 effects magnetic attraction of contactor 122 into engagement with stationary contact 118 for energization of fan means 28 through a circuit consisting of lead wire 108, fan means 28, lead wires 106 and 120, contactor 122, and lead wires 124, 90 and 92. It will be noted that engagement of contactor 122 and stationary contact 118 of relay 114 effectively short circuits temperature responsive switch 94, wherefore fan means 28 is continuously energized during engagement of contactor 64 and stationary contact 62 irrespective of operation of switch 94. It will be further noted that such operation of manual switch 60 prevents operation of the heating unit due to disconnection of generator 46 and the control circuit for the heating unit.

It is thus seen that the present invention provides temperature control apparatus wherein a manually operable heating-cooling switch 60 together with a thermostatic switch 48, both controlling a thermoelectric circuit (i.e., low powered), may be positioned within a space 12, the temperature of which is to be controlled. It is further noted that such arrangement is provided without running higher outside power lines into the space, the temperature of which is to be controlled, and eliminates the need for expensive transformers.

Referring to Figure 2 of the drawings, it shows an air duct 16' positioned within space 14' and extending into a suitable opening in floor section 10'. Positioned within duct 16' is a heating unit 18' of the fluid fuel burning type and a cooling or refrigerating unit 200. Heating unit 18' comprises a sheet metal enclosure 20' formed with partition walls or dividers affording a combustion chamber 22' having communication with a flue or exhaust stack 24' for removal of the products of combustion. Such partition walls also provide a bonnet or a plenum chamber 26' in heating relation to the combustion chamber 22' and having direct communication with the interior of air duct 16'.

Positioned within combustion chamber 22' is a main fuel burner 30'. A main fuel supply conduit 32' is provided to afford fuel flow to main burner 30' through a mixing chamber 34' as well understood in the art. An electroresponsive flow-control device 36' having an energizing coil 38' energizable to move a valve member 40' to flow-permitting position and deenergizable to permit return of valve member 40' to its flow-preventing position, is positioned within conduit 32' for control of fuel flow to main burner 30'. Juxtaposed with respect to main burner 30' within combustion chamber 22', is a pilot or ignition burner 42' afforded fuel flow independently of flow-control device 36' through a pilot fuel supply conduit 44'. A thermoelectric generator or thermocouple 46' is positioned adjacent pilot burner 42' for generation of an electrical potential whenever pilot burner 42' is ignited.

In this embodiment of the invention a cooling unit 200 is provided which may take the form of a refrigerating unit comprising a fluid conduit 202 filled with fluid refrigerant and formed into coils 204 to provide a heat exchanger portion and coils 206 to provide an evaporator portion. An expansion valve 208 is positioned in conduit 202 between heat exchanger 204 and evaporator 206. Operatively positioned in conduit 202 is a fluid pump or compressor 210 for circulating the fluid refrigerant in conduit 202 as is well understood in the art. An electrically driven fan 212 is disposed adjacent heat exchanger unit 204 and is operable to aid in removing heat from the fluid refrigerant.

Positioned within air duct 16' for moving heated air from within plenum chamber 26' or cooled air from about evaporator unit 206 is electrically operated fan means 214. Positioned within air duct 16' between heating unit 18' and cooling unit 200 is a single-pole double-throw temperature responsive circuit controlling device 216 comprising a bi-metal element 218 carrying a movable contact 220 for engagement alternatively with stationary contacts 222 and 224.

Positioned within space 12' are temperature responsive circuit controlling devices or thermostats 226 and 228. Thermostat 226 comprises an enclosure or bellows 230, preferably provided with a subatmospheric expansible and contractible volatile fluid fill, and cooperating electrical contact members 232 and 234 insulatedly fixed respectively to relatively movable opposite end walls 230a and 230b of bellows 230. Contact members 232 and 234 are each provided with a contact 232a and 234a, respectively, for engagement and disengagement upon contraction and expansion of the fluid fill of bellows 230. Adjusting means, shown more or less diagrammatically in Figure 2 as comprising a rotatable cam member 236, is provided to effect adjustment of the temperature required within bellows 230 to effect engagement and separation of contacts 232a and 234a.

Condition responsive circuit controlling device or thermostat 228 is similar to thermostat 226 in that it comprises an enclosure or bellows 238 preferably having a subatmospheric fluid fill and contact members 240 and 242 insulatedly fixed respectively to relatively movable opposite end walls 238a and 238b of bellows 238. Each of contact members 240 and 242 is provided with a contact 240a and 242a, respectively. However, thermostat 228 differs from thermostat 226 in that contact members 240 and 242 are so shaped as to effect engagement of contacts 240a and 242a upon expansion of the fluid fill of bellows 238 while contraction thereof effects disengagement of said contacts. Adjusting means is also provided for thermostat 228 to facilitate adjustment of the temperature required within bellows 238 to effect engagement and disengagement of contacts 240a and 242a, such adjusting means being shown in Figure 2 as comprising a rotatable cam member 244.

A manually operable single-pole double-throw switch 246 having a movable pole or contactor 248 is also provided. Switch 246 comprises a first stationary contact 250 connected to contact member 240 of thermostat 228 by means of a lead wire 252, and a second stationary contact 254 connected to contact member 232 of thermostat 226 by means of a lead wire 256. Contactor 248 is connected in circuit with one side of thermocouple 46' by a lead wire 258.

A lead wire 260 affords connection of contact member 234 of thermostat 226 with one side of an energizing winding 262 of an electroresponsive relay 264 while a lead wire 266 affords connection of contact member 242 of thermostat 228 with one side of an energizing winding 268 of another electroresponsive relay 270. The other sides of energizing windings 262 and 268 are connected to one side of thermocouple 46' by means of lead wires 272 and 274.

Relay 264 comprises a stationary contact 276 connected to one side of energizing winding 38' of flow-control device 36' by means of a lead wire 278 and a movable contactor 280 connected to an electrical conductor 282. The other side of coil 38' is connected to another electrical conductor 284 by a lead wire 286. Electrical conductors 282 and 284 are connected to a source of outside power (not shown) to afford energization of various electrical components, as will hereinafter appear.

Relay 270 comprises a stationary contact 288 connected to one side of pump 210 by means of a lead wire 290, and a movable contactor 292 connected in circuit with electrical conductor 282 by a lead wire 294. The other side of pump 210 is connected by a lead wire 296 to conductor 284. One side of electrically operated fan means 212 is connected to conductor 284 by lead wire 298, the other side thereof being connected to lead wire 290 by a lead wire 300.

One side of electrically operated fan means 214 is connected to conductor 284 by a lead wire 302 while the other side thereof is connected to bimetal element 218 of switch 216 by a lead wire 304. Stationary contact 222 of switch 216 is connected by means of a lead wire 306 to conductor 282. The other stationary contact 224 of switch 216 is connected to lead wire 306 by a lead wire 308.

The operation of the second embodiment shown in Figure 2 of the drawings is as follows:

The fuel emitted at pilot burner 42' as supplied thereto through conduit 44' may be ignited in any desired manner. The flame at pilot burner 42' effects heating of the hot junction of thermocouple 46' for generation of an electrical potential across the junctions thereof.

If it is desired to maintain space 12' at a temperature higher than ambient temperature, it is necessary to move contactor 248 of manually operable switch 246 into engagement with stationary contact 254. Under these conditions, whenever the temperature of the fluid fill of bellows 230 drops below the temperature setting of thermostat 226, contacts 232a and 234a are brought into circuit completing engagement due to contraction of the fluid fill and corresponding relative movement of end walls 230a and 230b of bellows 230. Such engagement of contacts 232a and 234a causes thermocouple 46' to effect energization of winding 262 of electroresponsive relay 264 through a circuit including lead wire 258, contactor 248, lead wire 256, contact members 232 and 234, lead wire 260, winding 262, and lead wires 274 and 272. Energization of winding 262 causes movable contactor 280 of relay 264 to be magnetically attracted into engagement with stationary contact 276 for energization of coil 38' of flow-control device 36' through a circuit comprising conductor 282, contactor 280, lead wire 278, coil 38', lead wire 286 and conductor 284. Such energization of coil 38' effects movement of valve member 40' to flow-permitting positions, whereupon fluid fuel is permitted to flow to main burner 30' through main fuel conduit 32'. The fluid fuel thus emitted at main burner 30' is ignited by the flame of pilot burner 42' for heating of the air within plenum chamber 26'.

As the temperature in plenum chamber 26' increases, bimetal element 218 of temperature responsive switch 216 deforms accordingly until a predetermined temperature is reached effecting engagement of electrical contacts 220 and 222. Such operation of switch 216 effects energization of fan means 214 through a circuit consisting of conductor 282, lead wire 306, switch 216, lead wire 304, fan means 214, lead wire 302 and conductor 284. Energization of fan means 214 causes the heated air within plenum chamber 26' to be moved or pushed through air duct 16' into space 12' for increasing the temperature about switch 226.

The temperature within space 12' and about switch 226 continues to increase until the fluid fill of bellows 230 expands sufficiently to effect separation of contacts 232a and 234a. Such relative movement of contacts 232a and 234a interrupts energization of winding 262 of electroresponsive relay 264 whereupon valve member 40' of flow control device 46' is permitted to return to flow-preventing position by virtue of deenergization of coil 38' thereof as effected by disengagement of contactor 280 and stationary contact 276 of switch 264. Thus, further heating of the air within plenum chamber 26' is prevented, although fan means 214 continues to be energized for movement of heated air through air duct 16' until the temperature near plenum chamber 26' decreases sufficiently to cause bimetal element 218 of switch 216 to effect separation of electrical contacts 220 and 222. Under these conditions, the temperature within space 12' is at or about the temperature desired to be maintained therewithin.

When the temperature within space 12' decreases to below such desired temperature, the aforementioned heating operation is again effected, the fluid fill of bellows 230 effecting electrical engagement of contacts 232a and 234a for sequential energization of winding 262 by thermocouple 46' and coil 38' by the outside source of power. Temperature responsive switch 216 will again respond to a predetermined temperature within plenum chamber 26' to effect energization of fan means 214 for moving the heated air through air duct 16'.

If the temperature desired to be maintained within space 12' is less than the ambient temperature, it is merely necessary to move contactor 248 of switch 246 out of engagement with stationary contact 254 and into engagement with stationary contact 250. Under these conditions, whenever the temperature of bellows 238 is above the temperature setting of thermostat 228, contacts 240a and 242a are brought into circuit completing engagement due to expansion of the fluid fill and corresponding relative movement of end walls 238a and 238b of bellows 238. Such engagement of contacts 240a and 242a causes thermocouple 46' to effect energization of winding 268 of electroresponsive relay 270 through a circuit including lead wire 258, contactor 248, lead wire 252, contact members 240 and 242, lead wire 266, winding 268, and lead wire 272. Energization of winding 268 causes movable contactor 292 of relay 270 to be magnetically attracted into engagement with stationary contact 288 for energization of pump 210 through a circuit comprising conductor 282, lead wire 294, contactor 292, lead wire 290, pump 210, lead wire 296 and conductor 284. Such movement of contactor 292 also effects energization of fan means 212 in parallel circuit arrangement with pump 210. Energization of pump 210 and fan means 212 causes cooling of the air about evaporator portion 206 by virtue of circulation of the liquid refrigerant within conduit 202; heat exchanger portion 204 and fan means 212 cooperating to remove heat from the refrigerant and expansion valve 208 affording expansion of the refrigerant as it passes into evaporator portion 206.

As the temperature near switch 216 decreases, bimetal element 218 thereof deforms accordingly until a predetermined low temperature is reached effecting engagement of electrical contacts 220 and 224. Such operation of switch 216 effects energization of fan means 214 through a circuit consisting of conductor 282, lead wires 306 and 308, switch 216, lead wire 304, fan means 214, lead wire 302, and conductor 284. Energization of fan means 214 causes the cooled air within air duct 16' to be moved or pushed into space 12' for decreasing the temperature about thermostat 228.

The temperature within space 12' and about thermostat 228 continues to decrease until the fluid fill of bellows 238 contracts sufficiently to effect separation of contacts 240a and 242a. Such relative movement of contacts 240a and 242a interrupts energization of winding 268 of electroresponsive relay 270 whereupon pump 210 and fan means 212 are immediately deenergized by disengagement of contactor 292 and stationary contact 288 of switch 270. Thus, further cooling of the air within air duct 16' is prevented, although fan means 214 continues to be energized for movement of cooled air through duct 16' until the temperature therewithin decreases sufficiently to cause bimetal element 218 of switch 216 to effect separation of electrical contacts 220 and 224. Under these conditions, the temperature within space 12' is at or below the temperature desired to be maintained therewithin.

When the temperature within space 12' increases above such desired temperature, the aforementioned cooling operation is again effected, the fluid fill or bellows 238 effecting electrical engagement of contacts 240a and 242a for sequential energization of winding 268 by thermocouple 46' and pump 210 and fan means 212 by the outside source of power. Temperature responsive switch 216 will again respond to a predetermined low temperature within air duct 16' to effect energization of fan means 214 for moving the cooled air into space 12'.

It is thus seen that the present invention as shown in Figure 2 provides temperature control apparatus wherein a manually operable heating-cooling switch 246, a heating thermostat 226 and a cooling thermostat 228, all of which control thermoelectric circuits (i.e., low powered), may be positioned within a space 12', the temperature of which is to be controlled. It is further noted that such arrangement is provided without running higher outside power lines into the space the temperature of which is to be controlled and eliminates the need for conduit wiring or expensive transformers.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In temperature control apparatus including temperature varying means comprising heating and cooling means, said heating means comprising a main burner and an ignition burner therefor, fuel supply means for said main burner comprising electroresponsive control means energizable to afford fuel flow to said main burner and deenergizable to prevent fuel flow thereto, electrically driven fan means energizable to circulate the air at said temperature varying means, and operating means for said fan means including means responsive to either one of a predetermined high and a predetermined low temperature at said temperature varying means to effect energization of said fan means, the combination of, thermoelectrically powered control means comprising a thermoelectric generator subject to a flame at said ignition burner, first electroresponsive relay means energizable by said generator to effect energization of said main burner fuel control means, switch means including second electroresponsive relay means operatively associated with said cooling means and a remotely positioned manually operable switch in circuit with said generator and said first and second relay means and controlling thermoelectric power to render said generator incapable of energizing said first relay means and effective to energize said second relay means for operation of said cooling means in response to thermoelectric power afforded by said generator, and a separate low resistance thermostatic switch in circuit with each of said first and second relay means, said thermostatic switches being positioned remotely of said temperature varying means and controlling the thermoelectric power afforded said first and second relay means, respectively, in accordance with predetermined temperature variations.

2. In a temperature control apparatus including temperature varying means comprising heating and cooling means, said heating means comprising a main burner and an ignition burner therefor, fuel supply means for said main burner comprising electroresponsive control means energizable to afford fuel flow to said main burner and deenergizable to prevent fuel flow thereto, electrically driven fan means energizable to circulate the air at said temperature varying means, and operating means for said fan means including means responsive to either one of a predetermined high and a predetermined low temperature at said temperature varying means to effect energization of said fan means, the combination of, thermoelectrically power control means comprising a thermoelectric generator subject to a flame at said ignition burner, first electroresponsive relay means energizable by said generator to effect energization of said main burner fuel control means, switch means including second electroresponsive relay means operatively associated with said cooling means and a manually operable switch in circuit with said generator and said first and second relay means operable to render said generator incapable of energizing said first relay means and effective to energize said second relay means for operation of said cooling means in response to thermoelectric power afforded by said generator, and a separate thermostatic switch in circuit with each of said first and second relay means, each of said thermostatic switches comprising encapsulated low resistance contacts controlling from a remote position the thermoelectric power afforded said first and second relay means, respectively, in accordance with predetermined temperature variations.

References Cited in the file of this patent

UNITED STATES PATENTS

| | | |
|---|---|---|
| 2,155,256 | Crago | Apr. 18, 1939 |
| 2,321,852 | Ray | June 15, 1943 |
| 2,348,143 | Miller | May 2, 1944 |
| 2,375,569 | McCarty | May 8, 1945 |
| 2,547,657 | Olson | Apr. 3, 1951 |
| 2,699,922 | Herbst | Jan. 18, 1955 |